United States Patent
Takemoto et al.

(10) Patent No.: US 11,381,141 B2
(45) Date of Patent: Jul. 5, 2022

(54) MOTOR

(71) Applicant: Nidec Corporation, Kyoto (JP)

(72) Inventors: Mitsuhiro Takemoto, Kyoto (JP); Sho Fukuhara, Kyoto (JP); Shinji Takemoto, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 164 days.

(21) Appl. No.: 16/934,050

(22) Filed: Jul. 21, 2020

(65) Prior Publication Data

US 2021/0036584 A1 Feb. 4, 2021

(30) Foreign Application Priority Data

Jul. 31, 2019 (JP) .............................. JP2019-141620

(51) Int. Cl.
| | | |
|---|---|---|
| *H02K 11/00* | (2016.01) | |
| *H02K 1/16* | (2006.01) | |
| *H02K 11/30* | (2016.01) | |
| *H02K 11/21* | (2016.01) | |
| *H02K 1/28* | (2006.01) | |
| *H02K 1/276* | (2022.01) | |

(52) U.S. Cl.
CPC ............... *H02K 11/30* (2016.01); *H02K 1/16* (2013.01); *H02K 1/276* (2013.01); *H02K 1/28* (2013.01); *H02K 11/0094* (2013.01); *H02K 11/21* (2016.01)

(58) Field of Classification Search
CPC .......... H02K 11/30; H02K 1/16; H02K 1/276; H02K 1/28; H02K 11/0094; H02K 11/21; H02K 1/187; H02K 1/2786; H02K 21/22
See application file for complete search history.

(56) References Cited

U.S. PATENT DOCUMENTS

2009/0072638 A1* 3/2009 Nomura ............... H02K 5/1735
310/91
2013/0187499 A1 7/2013 Watanabe et al.

FOREIGN PATENT DOCUMENTS

| | | |
|---|---|---|
| JP | 08-180513 A | 7/1996 |
| JP | 5320822 B2 | 10/2013 |
| JP | 5593958 B2 | 9/2014 |
| JP | 6088227 B2 | 3/2017 |

* cited by examiner

*Primary Examiner* — Thomas Truong
(74) *Attorney, Agent, or Firm* — Keating & Bennett

(57) ABSTRACT

A motor includes a rotor rotatable about a center axis extending vertically, a stator radially opposing the rotor, a bracket holding the stator, a circuit board including an upper surface with a first wiring pattern and a lower surface with a second wiring pattern, and a first fixing portion having conductivity and fixing the circuit board to the stator. The stator includes a stator core having conductivity. The first fixing portion includes a board holding portion holding the circuit board, and a stator fixed portion fixed to a portion of the stator core. The board holding portion is in contact with the first wiring pattern and the second wiring pattern.

9 Claims, 13 Drawing Sheets

MOTOR

CROSS REFERENCE TO RELATED APPLICATION

The present application claims priority under 35 U.S.C. § 119 to Japanese Application No. 2019-141620 filed on Jul. 31, 2019, the entire contents of which are hereby incorporated herein by reference.

FIELD OF THE INVENTION

The present disclosure relates to a motor.

BACKGROUND

Conventional capstan motors have a structure in which a stator core, a supporting stand, and a circuit board are axially sandwiched between a bearing holder and an iron plate, and are fixed by inserting a screw into a through-hole formed in each component to allow the screw to be screwed into the iron plate.

Unfortunately, the above structure may cause the screw to have no contact with the circuit board, so that the stator core and the circuit board may not have stable continuity therebetween.

SUMMARY

A motor according to an example embodiment of the present disclosure includes a rotor rotatable about a center axis extending vertically, a stator radially opposing the rotor, a bracket holding the stator, a circuit board including an upper surface with a first wiring pattern and a lower surface with a second wiring pattern, and a first fixing portion having conductivity and fixing the circuit board to the stator. The stator includes a stator core having conductivity, and the first fixing portion includes a board holding portion holding the circuit board, and a stator fixed portion fixed to a portion of the stator core. The board holding portion is in contact with the first wiring pattern and the second wiring pattern.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present disclosure will be described in detail with reference to the drawings. In the present specification, a direction parallel to a center axis Cx of a shaft extending vertically is indicated as an "axial direction". A direction orthogonal to the center axis Cx is indicated as a "radial direction". In addition, a direction along an arc about the center axis Cx is indicated as a "circumferential direction". Above and below a motor 100 are defined with reference to the motor 100 illustrated in FIG. 1. The name of each direction described above is used for the sake of explanation, and does not limit a positional relationship and a direction of the motor 100 when in use.

Figure 1:
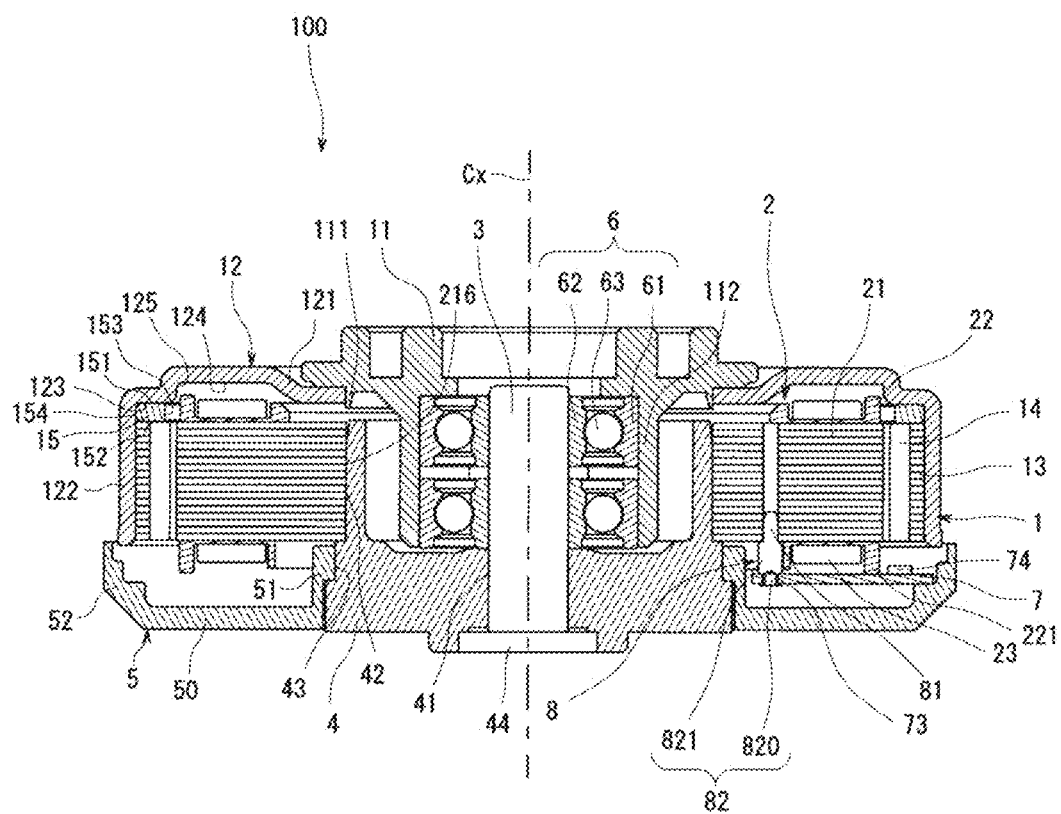
FIG. 1 is a longitudinal sectional view of a motor according to an example embodiment of the present disclosure.
Figure 2:
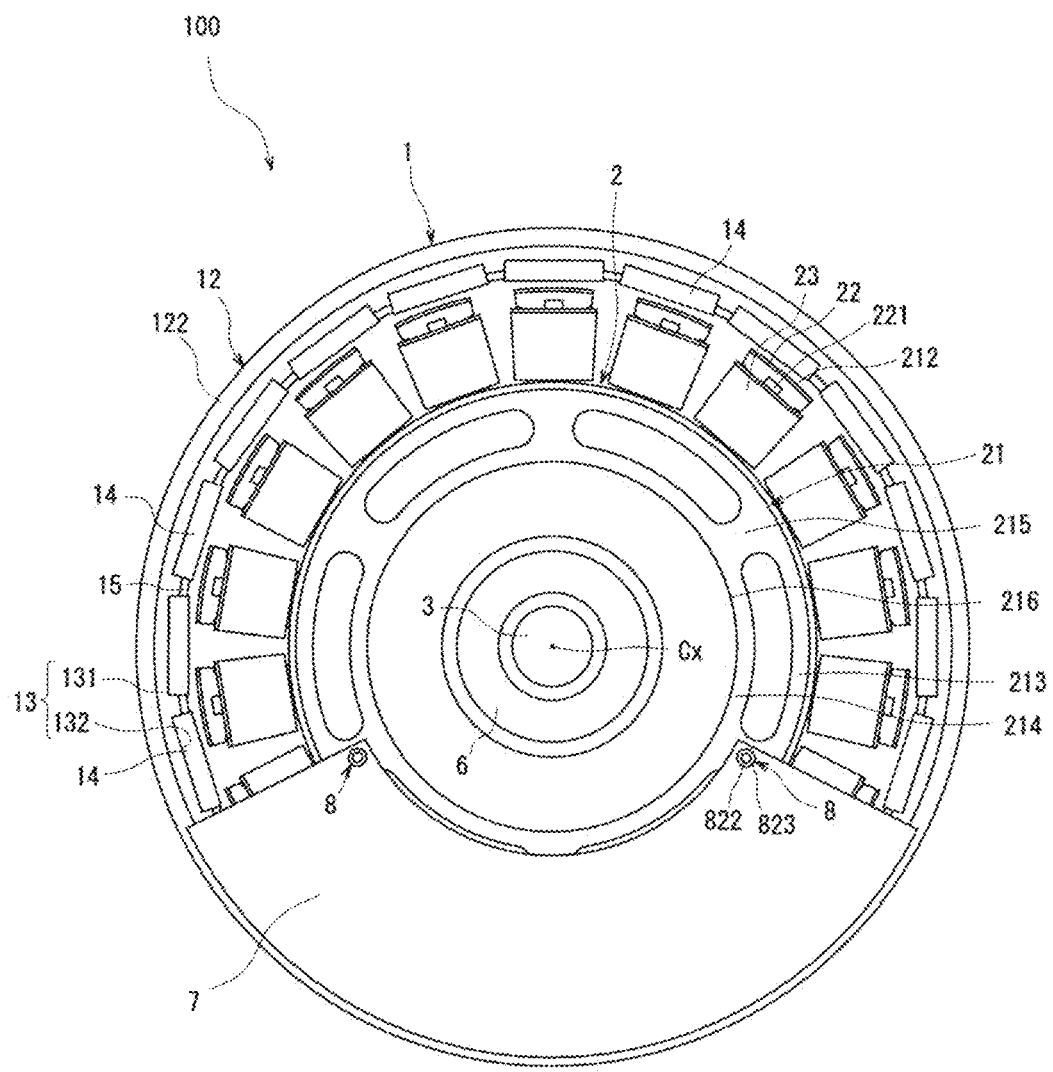
FIG. 2 is a view of a rotor and a stator of the motor illustrated in FIG. 1 as viewed from below in an axial direction.
Figure 3:
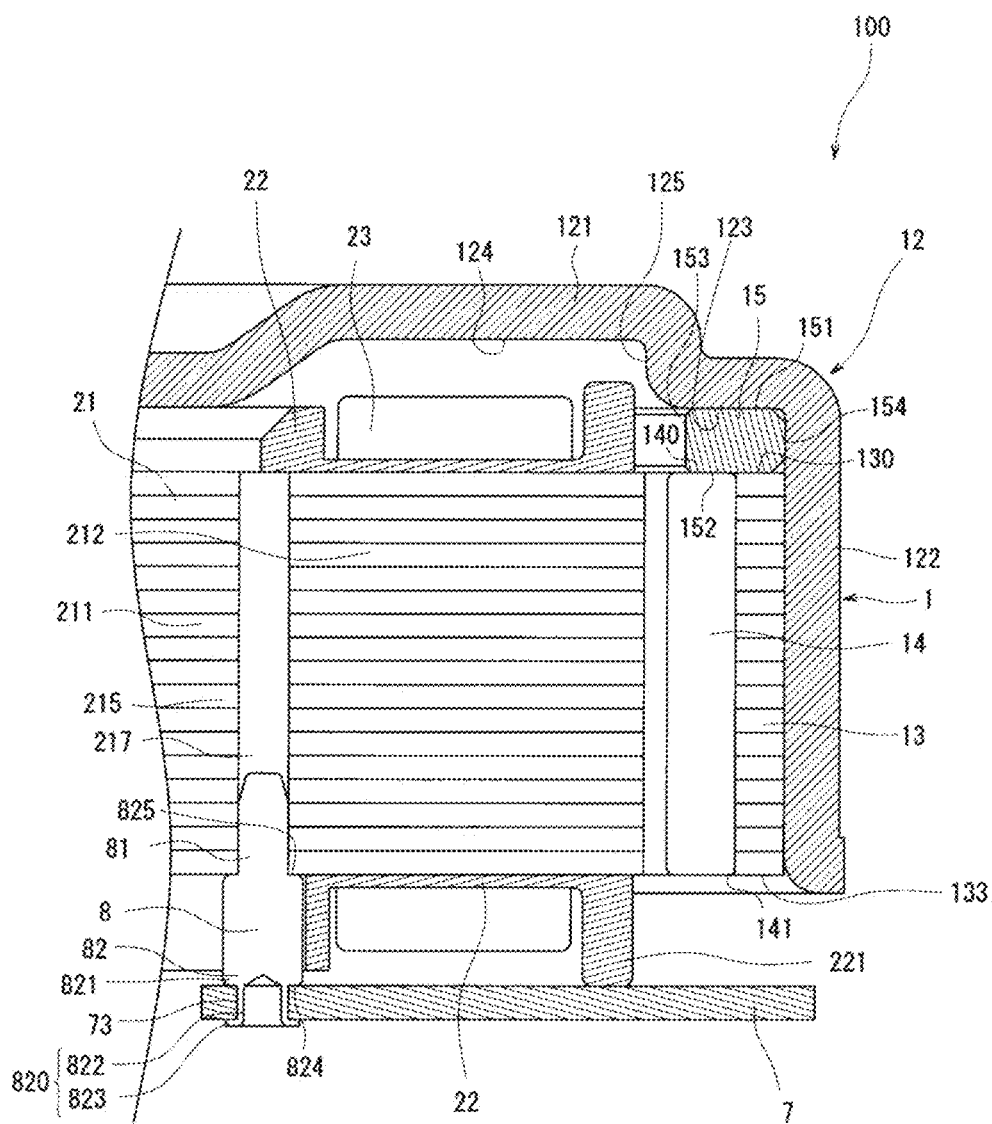
FIG. 3 is an enlarged longitudinal sectional view of a rotor and a stator of a motor according to an example embodiment of the present disclosure.

FIG. 1 is a longitudinal sectional view of the motor 100 according to the present disclosure. FIG. 2 is a view of a rotor 1 and a stator 2 of the motor 100 illustrated in FIG. 1 as viewed from below in the axial direction. FIG. 3 is an enlarged longitudinal sectional view of the rotor 1 and the stator 2 of the motor 100. FIG. 2 does not illustrate a bracket 4 and a frame 5.

As illustrated in FIGS. 1 to 3, the motor 100 includes the rotor 1, the stator 2, a shaft 3, the bracket 4, the frame 5, a bearing 6, a circuit board 7, and a first fixing portion 8. The stator 2 is held by the bracket 4. That is, the bracket 4 holds the stator 2. The rotor 1 extends along the center axis Cx, and is rotatably supported by the shaft 3 fixed to the bracket 4 via the bearing 6. The rotor 1 has an inner surface facing an outer surface of the stator 2 in the radial direction. That is, the motor 100 is a brushless DC motor of an outer rotor type. Hereinafter, details of each part of the motor 100 will be described with reference to the drawings.

As illustrated in FIG. 1, the bracket 4 and the frame 5 are disposed below in the motor 100 in the axial direction to cover the rotor 1 and the stator 2 from below in the axial direction. The bracket 4 is disposed at a lower end portion of the motor 100 in the axial direction. The bracket 4 has the center aligned with the center axis Cx. The bracket 4 includes a shaft holding portion 41, a stator holding portion 42, and a frame holding portion 43.

The shaft holding portion 41 is disposed in a central portion of the bracket 4 in the radial direction. The shaft holding portion 41 is a through-hole into which the shaft 3 is inserted. The shaft 3 is inserted into the shaft holding portion 41 and is fixed. Although examples of a method for fixing the shaft 3 include press-fitting, the present disclosure is not limited thereto. For example, welding, adhesion, bonding, and the like may be available. When the bracket 4 is a resin molding, the shaft holding portion 41 may be integrally molded by insert molding.

The shaft 3 may pass through the shaft holding portion 41. Specifically, an axially lower end portion of the shaft 3 may be positioned axially below an axial end portion of the shaft holding portion 41. The shaft holding portion 41 may have a portion (an axially lower end portion in FIG. 2) into which the shaft 3 is not inserted. The shaft holding portion 41 is provided at its bottom with a tabular shaft lid portion 44. When coming into contact with the shaft 3, the shaft lid portion 44 can axially position the shaft 3. When the shaft lid portion 44 is attached, contamination of foreign materials into the shaft holding portion 41 can be reduced and the shaft 3 can be prevented from being exposed outside. Although the bracket 4 of the present example embodiment has a structure in which the shaft lid portion 44 is attached to a recessed portion having an inner diameter larger than that of the shaft holding portion 41, the present disclosure is not limited to the structure. For example, the shaft lid portion 44 may be configured to be at least partly disposed inside the shaft holding portion 41.

The stator holding portion 42 has a tubular shape projecting axially upward from a radially outer edge of the bracket 4. The stator holding portion 42 has a radially inner surface facing an outer surface of the shaft 3 at an interval. The shaft and the stator holding portion 42 have a radial interval therebetween in which a rotor hub 11, described below, of the rotor is partly disposed. Then, the rotor hub 11 is rotatably supported by the shaft 3 using the bearing 6. Details of the rotor hub 11 and the bearing 6 will be described below.

The frame holding portion 43 is provided on an outer surface of the bracket 4. The frame 5 is fixed to the bracket 4 while being in contact with the frame holding portion 43. Here, the frame 5 will be described. The frame 5 includes a frame planar portion 50, a frame tubular portion 51, and a frame protruding portion 52.

The frame planar portion 50 has a plate-like shape extending in a direction orthogonal to the center axis Cx. The frame planar portion 50 has an annular shape provided in its radially central portion with the frame tubular portion 51.

The frame tubular portion 51 has a tubular shape extending axially upward. The frame tubular portion 51 has an inner surface constituting a through-hole that axially passes through the frame tubular portion 51. The inner surface of the frame tubular portion 51 is in contact with the frame holding portion 43. This causes the frame 5 to be fixed to the bracket 4. Although examples of a method for fixing the frame holding portion 43 to the frame tubular portion 51 include press-fitting, the method is not limited to press-fitting. For example, they may be fixed to each other by a method such as welding or bonding.

The frame protruding portion 52 has a tubular shape extending axially upward from a radially outer edge of the frame planar portion 50. Providing the frame protruding portion 52 enables increasing rigidity of the frame 5. The frame protruding portion 52 can enclose the periphery of the circuit board 7, and also can protect the circuit board 7. Specifically, this enables reducing contamination of foreign substance into the circuit board 7 from outside the motor 100.

Next, the stator 2 will be described. The stator 2 radially faces the rotor 1. The stator 2 generates magnetic flux in accordance with driving current. As illustrated in FIGS. 2 and 3, the stator 2 includes a stator core 21, an insulator 22, and a coil 23.

The stator core 21 is a magnetic body. For example, the stator core 21 is formed by layering electromagnetic steel plates in the axial direction. That is, the stator 2 includes the stator core 21 having conductivity and radially faces the rotor 1. Then, the stator core 21 includes a core back portion 211 and a plurality of teeth 212. The stator core 21 includes the core back portion 211 in a tubular shape extending along the center axis Cx, and the plurality of teeth 212. As illustrated in FIG. 2, the core back portion 211 includes a first annular portion 213, a second annular portion 214, and a support rib 215.

The first annular portion 213 has an annular shape with the center aligned with the center axis Cx. The second annular portion 214 is disposed radially inward of the first annular portion 213 at an interval. As with the first annular portion 213, the second annular portion 214 also has the center aligned with the center axis Cx. Specifically, the second annular portion 214 is disposed radially inward of the first annular portion 213 while being concentric with the first annular portion 213. A plurality of support ribs 215 connects the first annular portion 213 and the second annular portion 214 in the radial direction. That is, the plurality of support ribs 215 extends in the radial direction to connect the first annular portion 213 and the second annular portion 214 in the radial direction.

The second annular portion 214 is provided at its center with a through-hole 216 in a plane orthogonal to the center axis Cx. Into the through-hole 216, the stator holding portion 42 of the bracket 4 is inserted. The stator holding portion 42 has an outer surface that comes into contact with an inner surface of the second annular portion 214. That is, the second annular portion 214 has an annular shape fixed to the bracket 4. This causes the core back portion 211 to be fixed to the bracket 4.

The second annular portion 214 and the stator holding portion 42 are fixed to each other by press-fitting, for example. However, fixing between the second annular portion 214 and the stator holding portion 42 is not limited to press-fitting, and methods enabling firm fixing between the second annular portion 214 and the stator holding portion 42, such as bonding and welding, can be widely used. The stator 2 has the center aligned with the center axis Cx.

The teeth 212 extend radially outward from an outer surface of the first annular portion 213. That is, the plurality of teeth 212 extends radially outward from the core back portion 211 to be disposed in a radial manner. The first annular portion 213 has an annular shape connected to the teeth 212.

The core back portion 211 includes the first annular portion 213 and the second annular portion 214, so that stress to act on the second annular portion 214 to fix the second annular portion 214 to the stator holding portion 42 is less likely to act on the first annular portion 213. This enables reducing displacement of the teeth 212 and deformation of the teeth 212 due to stress at the time of fixing the core back portion 211.

The support rib 215 of the stator core 21 is formed with a fixing portion insertion portion 217 extending in the axial direction (refer to FIG. 3). The fixing portion insertion portion 217 extends axially upward from a lower surface of the stator core 21. The fixing portion insertion portion 217 may be a hole portion in a recessed shape with an axially upper end closed, or may be a through-hole passing through in the axial direction. Into the fixing portion insertion portion 217, a stator fixed portion 81, described below, of the first fixing portion 8 is inserted. That is, the stator fixed portion 81 is fixed radially inward of radially inner ends of the teeth 212 of the core back portion 211. The stator fixed portion 81 is fixed to the support rib 215.

As illustrated in FIG. 2, the circuit board 7 is formed in an arch-like shape. Specifically, the shape is acquired by cutting an annular flat plate in a circumferential direction within a predetermined center angle range, and has an outer peripheral surface in an arc-like shape as viewed in the axial direction. The circuit board 7 is fixed to the stator core 21 at two places that are opposite ends in the circumferential direction with respective first fixing portions 8. The circuit board 7 is fixed at its opposite ends in the circumferential direction to the stator core 21 with the respective first fixing portions 8. That is, two fixing portion insertion portions 217 are each disposed in a different support rib 215 of the core back portion 211. The fixing portion insertion portion 217 is provided at a position aligned with a board through-hole 73 of the circuit board 7 in the axial direction when the circuit board 7 is disposed in an attaching position in the stator core 21 (refer to FIG. 3). When the circuit board 7 is configured to be fixed at its opposite ends in the circumferential direction, the first fixing portions 8 can be disposed at a wide interval. This enables the circuit board 7 to be stably fixed.

The insulator 22 is disposed enclosing a part of the core back portion 211 of the stator core 21 and at least partly the teeth 212. The insulator 22 is, for example, formed of resin having insulating properties. The insulator 22 includes an insulator protruding portion 221 provided at a radially outer end of the teeth 212 while extending in the axial direction. The insulator protruding portion 221 is a guide used when a conducting wire of the coil 23 is wound. The insulator 22 is also provided in its radially inside portion with a wall portion extending in the axial direction as with the insulator protruding portion 221. The insulator protruding portion 221 also serves as a holding portion for holding the circuit board 7.

The coil 23 is formed by winding a conducting wire around the teeth 212 enclosed by the insulator 22. The coil 23 is insulated from the teeth 212 by the insulator 22. The coil 23 is excited by supplying electric current to the conducting wire. The motor 100 rotates the rotor 1 using attraction and repulsion between the coil 23 and a magnet 14.

The circuit board 7 is disposed below the motor 100 in the axial direction. Specifically, the circuit board 7 is disposed at a position facing an axially lower surface of each of the rotor 1 and the stator 2 in the axial direction. The circuit board 7 is mounted with a circuit for supplying electric power (electric current) to the coil 23. Examples of a circuit for supplying electric power include an inverter circuit, a control circuit, and the like. The circuit board 7 may be mounted with a power source circuit. As illustrated in FIG. 2, the circuit board 7 has an arch-like shape extending in the circumferential direction as viewed in the axial direction. That is, the circuit board 7 is disposed along the circumferential direction. However, the circuit board 7 is not limited thereto, and may be in a shape such as a rectangle. Circuit boards each having a shape extending in the circumferential direction can be widely used. The circuit board 7 may be in an annular shape having a central portion provided with a through-hole, and may be disposed enclosing a radially outer portion of the bracket 4.

Figure 4:
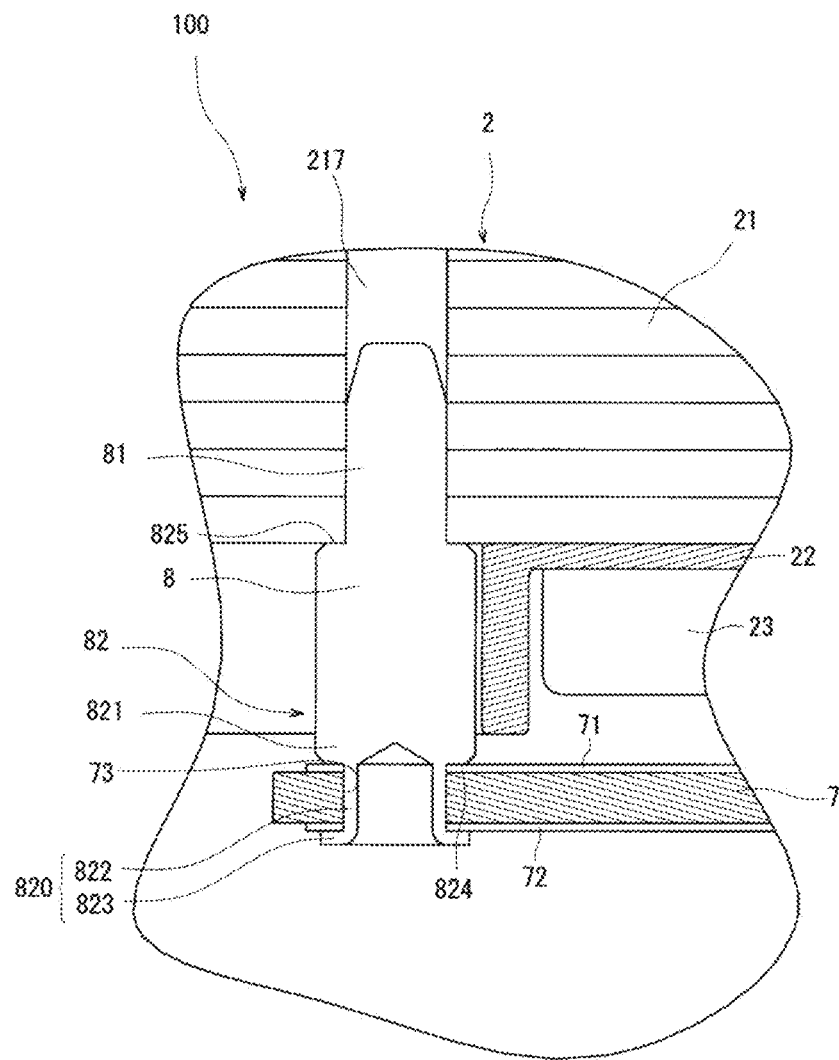
FIG. 4 is an enlarged sectional view of a fixed portion of a circuit board according to an example embodiment of the present disclosure.

As illustrated in FIG. 4, the circuit board 7 includes a first wiring pattern 71, a second wiring pattern 72, and the board through-hole 73. The first wiring pattern 71 is formed on an upper surface of the circuit board 7 in the axial direction, i.e., on a surface axially facing the lower surface of each of the rotor 1 and the stator 2 in the axial direction. The second wiring pattern 72 is formed on a lower surface of the circuit board 7 in the axial direction, i.e., on a surface opposite to the surface facing the rotor 1 and the stator 2. That is, the circuit board 7 has the upper surface formed with the first wiring pattern 71, and the lower surface formed with the second wiring pattern 72. In the present example embodiment, the illustrated first wiring pattern 71 and second wiring pattern 72 are identical in potential.

The board through-hole 73 passes through the circuit board 7 in the axial direction. In the present example embodiment, the board through-hole 73 is formed inside the circuit board 7, and has a hole-like shape closed in the circumferential direction. However, the board through-hole 73 is not limited thereto, and may be formed in a peripheral portion of the circuit board 7, having a shape with an opening formed in a part of an outer peripheral portion of the board through-hole 73, e.g., a cut-out shape. Through the board through-hole 73, at least a part of a board holding portion 82, described below, of the first fixing portion 8 passes vertically. That is, the circuit board 7 is formed with the board through-hole 73 through which at least a part of the board holding portion 82 passes vertically.

Then, as illustrated in FIG. 1, the circuit board 7 has the upper surface mounted with a position detection element 74. The position detection element 74 is, for example, a hall element that detects fluctuations of magnetic force of the magnet 14, described below, of the rotor 1 rotating to detect a rotational position of the rotor 1. The position detection element 74 is disposed below the magnet 14 in the axial direction. The rotor 1 may be separately provided with a component for position detection so that a position of the component for position detection is detected by the position detection element 74. That is, the circuit board 7 is mounted with the position detection element 74 for detecting a position of the rotor 1.

The circuit board 7 is fixed to the stator core 21 with the first fixing portion 8. Next, details of the first fixing portion 8 will be described with reference to additional drawings. FIG. 4 is an enlarged sectional view of a fixed portion of the circuit board 7. The first fixing portion 8 is made of material having conductivity, such as stainless steel, aluminum, or aluminum alloy. That is, the first fixing portion 8 having conductivity fixes the circuit board 7 to the stator 2. As illustrated in FIGS. 3 and 4, the first fixing portion 8 includes the stator fixed portion 81 and the board holding portion 82.

The board holding portion 82 includes a large-diameter portion 821 and a leg portion 820. The large-diameter portion 821 has a cylindrical columnar shape extending in the axial direction. The large-diameter portion 821 has an outside diameter larger than an inner diameter of the board through-hole 73. That is, the board holding portion 82 includes the large-diameter portion 821 that has an outside diameter larger than an inner diameter of the board through-hole 73 and that extends in the axial direction.

The leg portion 820 extends downward in the axial direction from a lower surface 824 of the large-diameter portion 821. The leg portion 820 includes a small-diameter portion 822 and a caulked portion 823. The small-diameter portion 822 has a cylindrical shape. The small-diameter portion 822 has an outside diameter smaller than the outside diameter of the large-diameter portion 821. The small-diameter portion 822 extends downward in the axial direction from the lower surface 824 of the large-diameter portion 821.

The leg portion 820 is inserted into the board through-hole 73 from an upper surface side of the circuit board 7. The leg portion 820 has a lower end portion projecting from the lower surface of the circuit board 7 that is folded (caulked) radially outward to form the caulked portion 823. At this time, the caulked portion 823 comes into contact with the second wiring pattern. That is, the leg portion 820 is inserted into the board through-hole 73 and comes into contact with the second wiring pattern 72. More specifically, the leg portion 820 includes the small-diameter portion 822 having an outside diameter smaller than the large-diameter portion 821, being in contact with the lower surface 824, and the caulked portion 823 disposed below the small-diameter portion 822, extending radially outward. The caulked portion 823 is in contact with the second wiring pattern 72.

Although in the present example embodiment, the caulked portion 823 indicates a shape after a caulking process is applied, the caulked portion 823 is not limited thereto. The portion including a state before the caulking process is applied may be referred to as the caulked portion 823. To facilitate the caulking process, the caulked portion 823 may be reduced in thickness to less than the small-diameter portion 822, or a boundary portion between the small-diameter portion 822 and the caulked portion 823 may be processed such that a groove is formed, for example.

The large-diameter portion 821 has an annular shape in a portion radially outside the small-diameter portion 822 in the lower surface 824. The large-diameter portion 821 is not limited to a cylindrical columnar shape as long as the large-diameter portion 821 has a projection plane in the axial direction having an outer edge positioned radially outside an outer edge of a projection plane of the small-diameter portion 822. For example, a column-like shape or a tubular shape, having a polygonal cross section, may be available. When the first fixing portion 8 is attached to the stator core 21, the lower surface 824 is disposed flush with a lower surface of the insulator protruding portion 221 and the stator core 21.

The stator fixed portion 81 has a cylindrical columnar shape extending axially upward from an upper surface 825 of the large-diameter portion 821 of the board holding portion 82. The stator fixed portion 81 has an outside diameter smaller than the outside diameter of the large-diameter portion 821. This causes the large-diameter portion 821 to have an annular portion radially outside the stator fixed portion 81 in the upper surface 825. The stator fixed portion 81 is press-fitted into the fixing portion insertion portion 217 of the stator core 21. That is, the stator fixed portion 81 is fixed to a part of the stator core 21.

At this time, the upper surface 825 comes into contact with the lower surface of the stator core 21. Fixing between the stator fixed portion 81 and the fixing portion insertion portion 217 is not limited to press-fitting. For example, screwing or the like may be available. Methods enabling the first fixing portion 8 to be firmly fixed while the stator fixed portion 81 is inserted into the fixing portion insertion portion 217 to bring the upper surface 825 into contact with the lower surface of the stator core 21 can be widely used.

Next, fixing between the circuit board 7 and the stator core 21 will be described. Stator fixed portions 81 of two first fixing portions 8 are press-fitted into respective two fixing portion insertion portions 217. At this time, the upper surface 825 of the large-diameter portion 821 comes into contact with the lower surface of the stator core 21, and the first fixing portion 8 is fixed to the stator core 21. This causes the stator core 21 and the first fixing portion 8 to be electrically connected to each other. That is, this causes the stator core 21 and the first fixing portion 8 to be identical in potential.

The fixing portion insertion portion 217 is provided in the support rib 215. That is, the stator fixed portion 81 is fixed radially inward of the teeth 212 of the stator core 21. This causes the circuit board 7 to be disposed at a position overlapping the stator core 21 in the axial direction, and causes the circuit board 7 and the stator core 21 to be fixed to each other. Thus, the motor 100 can be prevented from increasing in size in the radial direction.

When the fixing portion insertion portion 217 is provided in the support rib 215, a force for pressing the first fixing portion 8 is less likely to act on the teeth 212. Thus, the teeth 212 can be prevented from being deformed or displaced, for example, so that the motor 100 can be prevented from deteriorating in rotational accuracy. When the support rib 215 is provided with the fixing portion insertion portion 217, turbulence in a magnetic circuit formed in the stator core 21 can be reduced. This enables a magnetic force to be effectively used, and enables increase in torque and power saving.

After that, the leg portion 820 is inserted into the board through-hole 73 of the circuit board 7. At this time, the lower surface 824 of the large-diameter portion 821 comes into contact with the first wiring pattern 71. This causes the first wiring pattern 71 and the stator core 21 to be electrically connected to each other using the first fixing portion 8 having conductivity, i.e., causes the first wiring pattern 71 and the stator core 21 to be identical in potential. At this time, the upper surface of the circuit board 7 comes into contact with the insulator protruding portion 221 as well. That is, the circuit board 7 is held in the axial direction using the large-diameter portion 821 and the insulator protruding portion 221.

Then, the caulking process is conducted by folding the caulked portion 823, which is disposed in a lower end portion of the small-diameter portion 822, radially outward. This causes the circuit board 7 to be sandwiched between the large-diameter portion 821 and the caulked portion 823, and causes the board holding portion 82 to be held in the circuit board 7. The caulked portion 823 comes into contact with the second wiring pattern 72 on the lower surface of the circuit board 7. The caulked portion 823 is integrated with the small-diameter portion 822. Thus, the small-diameter portion 822 is electrically connected to the second wiring pattern 72 using the caulked portion 823.

This causes the circuit board 7 to be held to the stator core 21 using the board holding portion 82. The first fixing portion 8 having conductivity allows the second wiring pattern 72 and the stator core 21 to be electrically connected to each other. This causes the second wiring pattern 72 and the stator core 21 to be identical in potential. That is, the board holding portion 82 comes into contact with the first wiring pattern 71 and the second wiring pattern 72.

The circuit board 7 is made of metal or the like, and is held, for example, by the stator core 21 having higher rigidity than the insulator 22, using the first fixing portion 8. This enables the circuit board 7 to be fixed to the stator with high position accuracy and to be firmly fixed thereto. Additionally, unnecessary stress is less likely to act on the conducting wire of the coil 23, which is connected to the circuit board 7, so that electric power can be accurately supplied to the coil 23.

Fixing the circuit board 7 to the stator core 21 using the first fixing portion 8 enables the circuit board 7 and the stator core 21 to be electrically conducted to each other. This causes the stator core 21 and the circuit board 7 to be identical in potential, so that discharge between the stator core 21 and the circuit board 7 is less likely to occur. Thus, electronic components mounted on the circuit board 7 can be protected. For example, when the stator core 21 is grounded through the bracket 4 and the like, the circuit board 7 is grounded using the first fixing portion 8. This causes no ground wire to be connected to the circuit board 7, so that wiring can be simplified.

More specifically, the small-diameter portion 822 is inserted into the board through-hole 73 to bring the lower surface 824 of the large-diameter portion 821 into contact with the first wiring pattern 71 on the circuit board 7. When the small-diameter portion 822 is brought into contact with the second wiring pattern 72 on the circuit board 7 through the caulked portion 823, the stator core 21 is electrically connected to the first wiring pattern 71 and the second wiring pattern 72 on both sides of the circuit board 7. That is, when the circuit board 7 is held by the stator core 21 using the first fixing portion 8, the circuit board 7 can be held with high position accuracy, and the first wiring pattern 71 and the second wiring pattern 72 formed on the corresponding sides of the circuit board 7 can be easily electrically connected to the stator core 21. Additionally, the circuit board 7 can be held in a simple process such as caulking, and the circuit board 7 and the stator 2 can be brought into conduction through the first fixing portion 8.

Then, the position detection element 74 is mounted on the circuit board 7 firmly fixed to the stator core 21 having high rigidity. This causes a relative position between the position detection element 74 and the rotor 1 to be less likely to change. Thus, a position of the rotating rotor 1 can be accurately detected.

The circuit board 7 is held on the lower surface of the stator core 21 in the axial direction, but is not limited to this. For example, the circuit board 7 may be held on the upper surface thereof in the axial direction. Even in this case, the circuit board 7 is held using the first fixing portion 8. The circuit board 7 may be held on a portion other than the upper surface and the lower surface.

Figure 5:
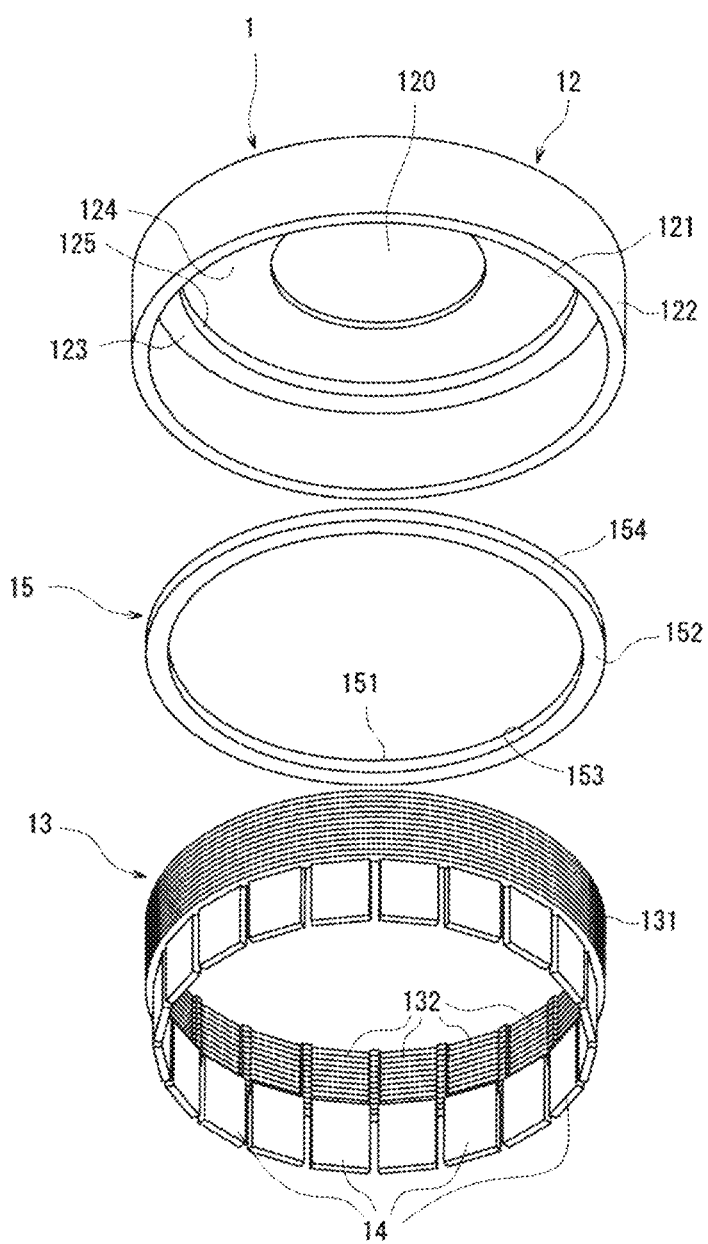
FIG. 5 is an exploded perspective view of a rotor according to an example embodiment of the present disclosure as viewed from below in the axial direction.

FIG. 5 is an exploded perspective view of the rotor 1 as viewed from below in the axial direction. The rotor 1 includes the rotor hub 11, a rotor holder 12, a rotor core 13, the magnet 14, and a spacer 15. The rotor 1 is rotatably supported by the shaft 3 using the bearing 6. The rotor 1 is rotatable about the center axis Cx extending vertically.

As illustrated in FIGS. 1, 3, and 5, etc., the rotor holder 12 includes a holder lid portion 121 and a holder tubular portion 122. The holder lid portion 121 has an annular shape extending in a direction orthogonal to the center axis Cx. The holder tubular portion 122 has a tubular shape extending axially downward from a radially outer edge of the holder lid portion 121.

The holder lid portion 121 is provided at its center with a hub through-hole 120. Into the hub through-hole 120, a holder fixing portion 111 of the rotor hub 11 is press-fitted and fixed. The fixing of the holder fixing portion 111 to the hub through-hole 120 is not limited to press fitting, and may be fixing such as bonding or welding. The holder fixing portion 111 may be fixed using a fixture, such as a screw. Fixing methods capable of firmly fixing the rotor hub 11 and the rotor holder 12 can be widely used.

The holder lid portion 121 includes a holder first surface 123, a holder second surface 124, and a connecting surface 125. The holder first surface 123 is a part of a lower surface of the holder lid portion 121 in the axial direction, and is formed in an annular shape extending radially inward from an inner surface of the holder tubular portion 122. The holder first surface 123 is a plane orthogonal to the center axis Cx. The holder second surface 124 is a part of the lower surface of the holder lid portion 121 in the axial direction, and is formed in an annular shape disposed radially inward of the holder first surface 123. The holder second surface 124 is disposed axially above the holder first surface 123. The connecting surface 125 connects a radially inner end of the holder first surface 123 and a radially outer end of the holder second surface 124. The connecting surface 125 has a shape in which a longitudinal section taken along a plane including the center axis Cx has a curved shape. However, the shape is not limited to this, and shapes connecting the radial inner end of the holder first surface 123 and the radially outer end of the holder second surface 124 are widely used.

In the motor 100 of the present example embodiment, the holder lid portion 121 is formed by pushing the holder second surface 124 upward in the axial direction. This causes a connecting portion between the holder lid portion 121 and the holder tubular portion 122 to be provided in its outer surface with a recessed portion recessed inward. However, the structure is not limited to this, and structures including the holder first surface 123, the holder second surface 124, and the connecting surface 125 can be widely used.

The rotor holder 12 has a portion where the holder first surface 123 and the holder second surface 124 are connected by the connecting surface 125, the portion also serving as a reinforcing portion. That is, providing the holder first surface 123, the holder second surface 124, and the connecting surface 125, enables the rotor holder 12 to be increased in rigidity.

The rotor hub 11 includes the holder fixing portion 111 and a bearing holding portion 112. The holder fixing portion 111 has a cylindrical shape extending axially downward from a body portion of the rotor hub 11. The holder fixing portion 111 has an outer surface that is press-fitted into the hub through-hole 120. This causes the rotor hub 11 to be fixed to the rotor holder 12. The holder fixing portion 111 is not limited to the above structure, and may be formed on an outer surface of the body portion, or may have a tubular shape extending axially upward.

The bearing holding portion 112 has a tubular shape extending axially downward from the body portion of the rotor hub 11. The bearing 6 is held on an inner surface of the bearing holding portion 112. The bearing holding portion 112 is rotatably supported by the shaft 3 using the bearing 6. This causes the rotor 1 to be rotatably supported by the shaft 3 fixed to the bracket 4 via the bearing 6. Although in the motor 100, the rotor 1 is rotatably supported by the shaft 3 via the bearing 6, the present disclosure is not limited to this. For example, the motor 100 may be configured such that the rotor 1 is fixed to the shaft 3, and the shaft 3 is rotatably supported by a fixing part such as the bracket 4.

Here, the bearing 6 will be described. The bearing 6 is a ball bearing. The bearing 6 includes an outer ring 61, an inner ring 62, and a plurality of balls 63. The outer ring 61 is fixed to the inner surface of the bearing holding portion 112. Although examples of a fixing method include press fitting, the method is not limited to the press fitting. For example, a fixing method such as bonding may be used. The inner ring 62 is fixed to the outer surface of the shaft 3. Although examples of fixing of the inner ring 62 onto the shaft 3 also include press-fitting as with fixing of the outer ring 61, the fixing is not limited thereto. The plurality of balls 63 is disposed side by side in a radial clearance between the outer ring 61 and the inner ring 62 in the circumferential direction.

When at least two bearings 6 are provided at positions away from each other in the axial direction, runout of the rotor with respect to the shaft 3 can be reduced. This enables improvement in rotational accuracy of the rotor 1. In the present example embodiment, the bearing 6 is a ball bearing, but is not limited to this. For example, a fluid dynamic bearing may be used as the bearing. When a fluid dynamic bearing is used, at least two dynamic pressure generating grooves are formed in respective portions away from each other in the axial direction. The portions where the dynamic pressure generating grooves are formed serve as bearings.

The rotor core 13 annularly surrounds the center axis Cx, and is formed by stacking a plurality of rotor pieces each formed of an electromagnetic steel plate or the like in the axial direction. The rotor core 13 is formed by stacking the plurality of rotor pieces in the axial direction and fixing them by using a fixing method such as caulking. This causes the rotor core 13 to be formed in a tubular shape extending along the center axis Cx. The fixing of the rotor pieces is not limited to caulking, and a fixing method such as bonding or welding may be used. The rotor core 13 is not limited to a stacked body, and may be a molded body formed by solidifying magnetic powder such as iron powder by sintering or the like.

As illustrated in FIG. 2 and the like, the rotor core 13 includes a rotor core tubular portion 131 and a plurality of rotor core groove portions 132. The rotor core tubular portion 131 has an annular shape about the center axis Cx. The rotor core tubular portion 131 has an outer surface that is in a cylindrical shape and is fixed inside the holder tubular portion 122. That is, the rotor core 13 is fixed inside the holder tubular portion 122. The holder tubular portion 122 of the rotor core 13 is fixed by press-fitting, for example. The fixing is not limited to press-fitting, and the holder tubular portion 122 may be fixed by bonding, welding, or the like. The holder tubular portion 122 may be fixed using a fixture, such as a screw.

The rotor core groove portions 132 are each a recessed portion that is recessed radially outward from an inner surface of the rotor core tubular portion 131. The rotor core groove portions 132 each extend from an upper end of the rotor core 13 in the axial direction to a lower end thereof. The number of the rotor core groove portions 132 is the same as that of the magnets 14. The plurality of rotor core groove portions 132 is disposed in the circumferential direction at intervals from the corresponding adjacent rotor core groove portions 132. The plurality of rotor core groove portions 132 is disposed at equal intervals in the circumferential direction.

The rotor 1 includes 20 magnets 14 in the present example embodiment. As illustrated in FIG. 5 and the like, the magnets 14 each have a rectangular parallelepiped shape. Although the rotor 1 according to the present example embodiment has a plurality of magnets 14, the present disclosure is not limited to this. For example, there may be available magnets each of which is acquired by forming magnetic material into a tubular shape, and is then alternately formed with a magnetic pole on its inner surface. The magnets 14 are housed and held in the corresponding rotor core groove portions 132. The holding of the magnets 14 in the corresponding rotor core groove portions 132 is performed by bonding, but is not limited to this. For example, the magnets 14 may be held by welding, adhesion, or the like, or may be fixed using a fixture such as a screw. That is, the rotor 1 holds one or more magnets.

The magnets 14 are each disposed protruding radially inward from an inner surface of the rotor core 13. The magnets 14 each have an inner surface radially facing the stator 2. The magnets 14 each have the inner surface on which a different magnetic pole (N-pole or S-pole) is disposed alternately. When the magnet is formed in a tubular shape, the rotor core 13 has a structure for holding an outer surface of the magnet. To more reliably fix the tubular magnet to the rotor core 13, a protruding portion may be formed on one of the magnet and the rotor core, and a recessed portion into which the protruding portion is inserted may be formed on the other.

As illustrated in FIGS. 3 and 5, at least a magnet upper surface 140, which is an upper surface of the magnet 14 in the axial direction, is in contact with the spacer 15. Next, the spacer 15 will be described. As illustrated in FIGS. 1 and 5, the spacer 15 has an annular shape about the center axis Cx. The spacer 15 includes a spacer first surface 151, a spacer second surface 152, a spacer inner surface 153, and a spacer outer surface 154.

The spacer 15 has an annular shape. That is, the spacer outer surface 154 is a cylindrical surface about the center axis Cx. Thus, the spacer outer surface 154 can support a rotor core upper surface 130 and the magnet upper surface 140 substantially uniformly throughout the entire circumference in the circumferential direction. The spacer outer surface 154 also comes into contact with the inner surface of the holder tubular portion 122 uniformly or substantially uniformly throughout the entire circumference in the circumferential direction. This causes the spacer 15 to be less likely to move in the holder tubular portion 122, and causes the rotor core 13 and the magnets 14 to be easily attached.

The spacer first surface 151 is an upper surface of the spacer 15 in the axial direction. The spacer first surface 151 comes into contact with the holder first surface 123. The spacer second surface 152 is a lower surface of the spacer 15 in the axial direction. The spacer second surface 152 comes into contact with the magnet upper surface 140 that is an upper surface of each of the magnets 14 in the axial direction. This causes the plurality of magnets 14 to be axially positioned when the magnet upper surface 140 comes into contact with the spacer 15.

This structure enables determining accurately and easily an axial position of each of the plurality of magnets 14. Thus, magnetic forces of the plurality of magnets 14 can be efficiently used. This enables improvement in torque without changing the motor 100 in size. Additionally, power consumption can be reduced as compared with a motor 100 having constant torque.

The spacer inner surface 153 is disposed at a radially inner end of the spacer 15. That is, the spacer inner surface 153 is a radially inner end of the spacer 15. The spacer outer surface 154 is a cylindrical surface. The spacer outer surface 154 comes into contact with the inner surface of the holder tubular portion 122. The spacer outer surface 154 and the inner surface of the holder tubular portion 122 may be in contact with each other to the extent that movement of the spacer 15 is restricted. That is, the spacer outer surface 154 and the inner surface of the holder tubular portion 122 are in contact with each other to the extent that the spacer 15 does not move due to frictional force.

As illustrated in FIGS. 1 and 3, the rotor core upper surface 130, which is an upper surface of the rotor core 13 in the axial direction, may also come into contact with the spacer second surface 152.

When the spacer first surface 151 comes into contact with the holder first surface 123, and the spacer second surface 152 comes into contact with the rotor core upper surface 130 and the magnet upper surface 140, the rotor core 13 and the magnet 14 are axially positioned with respect to the rotor holder 12.

As illustrated in FIG. 3, the connecting surface 125 of the holder lid portion 121 is disposed radially inward of the spacer inner surface 153. This causes the entire spacer first surface 151 to come into contact with the holder first surface 123. Thus, the spacer 15 comes into contact with the holder first surface 123 in a wide area, so that the rotor core 13 and the magnets 14 are accurately fixed to the rotor holder 12. The term, "accurately fixed" means that the rotor core 13 and the magnets 14 are fixed to the rotor holder 12 such that the centers of the rotor core 13 and the magnets 14 align with the center of the rotor holder 12 without being displaced.

The rotor core upper surface 130, which is the upper surface of the rotor core 13 in the axial direction, and the magnet upper surface 140, which is the upper surface of each of the magnets 14 in the axial direction, come into contact with the spacer 15 to be positioned in the axial direction.

A rotor core lower surface 133, which is a lower surface of the rotor core 13 in the axial direction, and a magnet lower surface 141, which is a lower surface of each of the magnets 14 in the axial direction, are both positioned axially above a lower end of the holder tubular portion 122 in the axial direction.

This structure prevents the rotor core 13 and the magnets from protruding downward from the lower end of the holder tubular portion 122 in the axial direction, so that the motor 100 can be reduced in height in the axial direction. The rotor core 13 and the magnets 14 are housed inside the rotor holder 12 in the axial direction, so that magnetic forces of the magnets 14 are less likely to be released to the outside to enable the magnetic forces to be efficiently used. This enables improvement in torque without changing the motor in size.

The spacer 15 may be made of a non-magnetic material. When the spacer 15 is made of a non-magnetic material, magnetic flux leakage from the magnet upper surface 140 of each of the magnets 14 to the holder lid portion 121 is reduced. Thus, utilization efficiency of the magnetic force of each of the magnets 14 can be improved. This enables improvement in torque of the motor 100 or reduction in power consumption thereof.

The spacer 15 may be made of a non-magnetic material. When the spacer 15 is made of a non-magnetic material, magnetic flux leakage from the magnet upper surface 140 of each of the magnets 14 to the holder lid portion 121 is reduced. Thus, utilization efficiency of the magnetic force of each of the magnets 14 can be improved. This enables reduction in power consumption of the motor 100.

Next, a procedure for attaching the rotor core 13 and the magnets 14 to the holder tubular portion 122 will be described. As illustrated in FIG. 5, each of the magnets 14 is attached to the corresponding one of the rotor core groove portions 132 of the rotor core 13. At this time, a lower end of each of the magnets 14 in the axial direction protrudes from the rotor core 13.

In this state, the spacer 15 is inserted inside the rotor holder 12. The spacer outer surface 154 of the spacer 15 and an inner surface of the rotor holder 12 come into contact with each other, and the spacer 15 is held inside the rotor holder 12 using a frictional force.

While a part of each of the magnets 14 is attached to the corresponding one of the rotor core groove portions 132, the rotor core 13 is disposed at a position allowing the rotor core 13 to be inserted from an opening at the lower end of the holder tubular portion 122 in the axial direction. Then, for example, a plate-shaped jig (not illustrated) is brought into contact with the lower surface of each of the magnets 14 in the axial direction and then the jig is moved upward in the axial direction. This causes each of the magnets 14 to move in the axial direction inside the corresponding one of the rotor core groove portions 132. The plurality of magnets 14 is simultaneously pressed by the jig. Thus, the plurality of magnets 14 is accurately adjusted in axial position.

When the magnets 14 are pushed into the corresponding rotor core groove portions 132 of the rotor core 13, the jig comes into contact with both the lower surface of each of the magnets in the axial direction and the lower surface of the rotor core 13 in the axial direction. Further moving the jig axially upward causes the rotor core 13 with the magnets 14 disposed in the corresponding rotor core groove portions 132 to be press-fitted into the holder tubular portion 122. When the rotor core upper surface 130 and the magnet upper surface 140 come into contact with the spacer second surface 152, the press-fitting using the jig is completed. The rotor core 13 and the magnets 14 are positioned in the axial direction by coming into contact with the spacer 15. Thus, even when the rotor core 13 and the magnets 14 are pushed with the plate-shaped jig, axial positions of the rotor core 13 and the magnets 14 can be accurately determined.

The magnets 14 are fixed to the corresponding rotor core groove portions 132 by bonding. Before the magnets 14 are attached, an adhesive may be applied to an inner surface of each of the rotor core groove portions 132 or a portion of each of the magnets 14 that comes into contact with the corresponding one of the rotor core groove portions 132. Alternatively, the rotor core 13 and the magnets 14 may be bonded to each other after the rotor core groove portions 132 are press-fitted into the holder tubular portion 122. When the rotor core 13 is press-fitted into the holder tubular portion 122, the rotor core 13 receives a force inward in the radial direction. At this time, the magnets 14 attached to the corresponding rotor core groove portions 132 are pressed in the circumferential direction and held by the rotor core 13. The force of pressing the rotor core 13 may be used as a part of a force for holding the magnets 14.

The method for fixing the rotor core 13 and the magnets 14 is an example, and the method is not limited to this.

In the present example embodiment, the rotor core upper surface 130 and the magnet upper surface 140 come into contact with the spacer second surface 152 of the spacer 15. When the rotor core 13 and the magnets 14 are brought into contact with the spacer second surface 152, axial positional accuracy of the rotor core 13 and the magnets 14 with respect to the rotor holder 12 can be easily increased.

Hereinafter, modifications of the motor according to the present disclosure will be described with reference to the drawings.

Figure 6:
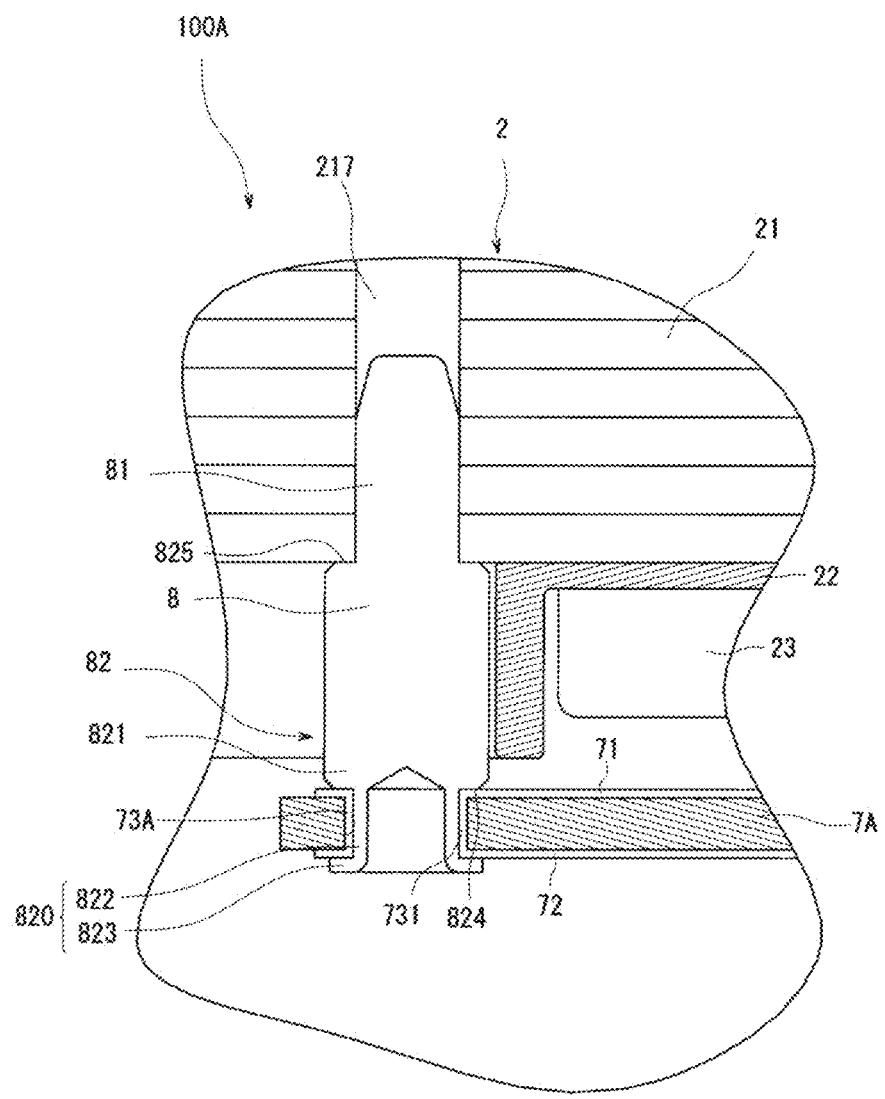
FIG. 6 is an enlarged sectional view of a fixed portion of a circuit board in a motor of a first modification of an example embodiment of the present disclosure.

FIG. 6 is an enlarged sectional view of a fixed portion of a circuit board 7A in a motor 100A of a first modification. The circuit board 7A includes a conductive portion 731 in a board through-hole 73A. Besides this, the circuit board 7A has the same configuration as the circuit board 7. Thus, a portion of the motor 100A that is substantially the same as that of the motor 100 is denoted by the same reference numeral, and duplicated detailed description will be eliminated.

As illustrated in FIG. 6, the conductive portion 731 is a conductive film. The conductive portion 731 is in close contact with an inner surface of the board through-hole 73A. Then, the conductive portion 731 is electrically connected to a first wiring pattern 71 and a second wiring pattern 72. More specifically, the conductive portion 731 is a conductive film similar to the first wiring pattern 71 and the second wiring pattern 72, and electrically connects the first wiring pattern 71 and the second wiring pattern 72. That is, the conductive portion 731 that electrically connects the first wiring pattern 71 and the second wiring pattern 72 of the circuit board 7A is formed on the inner surface of the board through-hole 73A.

When a small-diameter portion 822 is inserted into the board through-hole 73A, an outer surface of a leg portion 820 comes into contact with the conductive portion 731. Then, a first fixing portion 8 and the conductive portion 731 are electrically connected. This enables improvement in reliability of the electrical connection between the first fixing portion 8 and the first wiring pattern 71 as well as the second wiring pattern 72.

Figure 7:
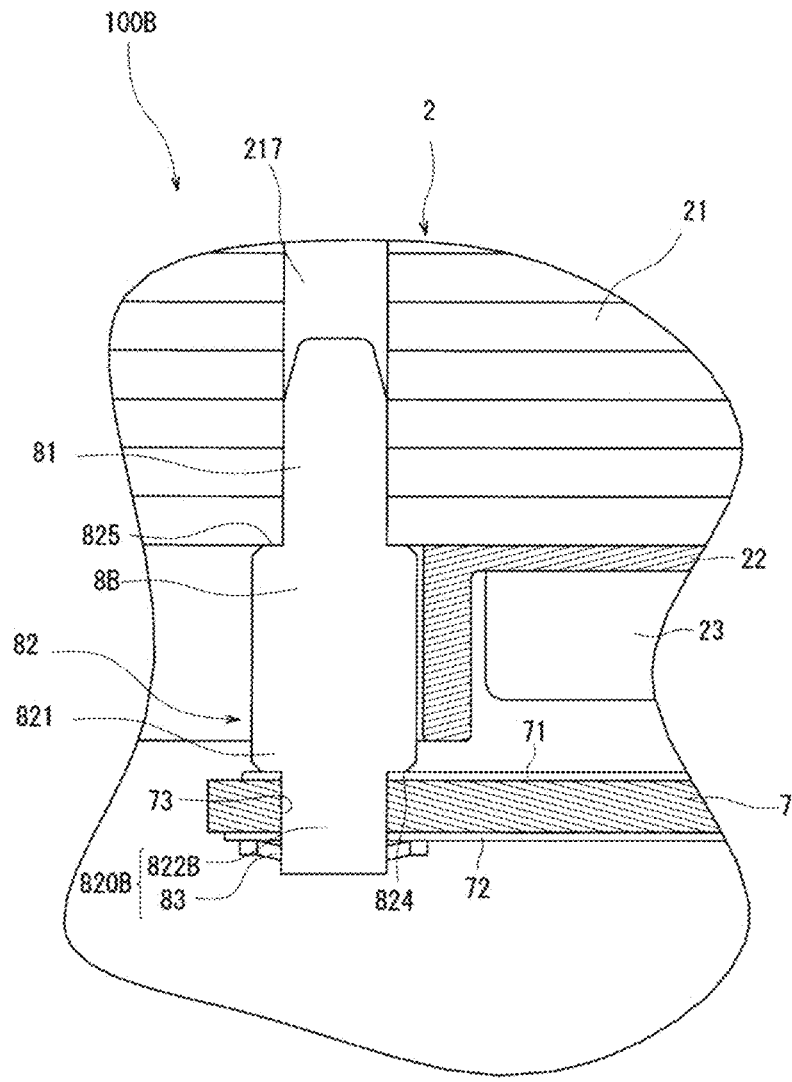
FIG. 7 is an enlarged sectional view of a fixed portion of a circuit board in a motor of a second modification of an example embodiment of the present disclosure.

FIG. 7 is an enlarged sectional view of a fixed portion of a circuit board 7 in a motor 100B of a second modification. In the motor 100B, the circuit board 7 is different in a leg portion 820B of a first fixing portion 8B. Besides this, the motor 100B has the same configuration as the motor 100. Thus, a portion of the motor 100B that is substantially the same as that of the motor 100 is denoted by the same reference numeral, and duplicated detailed description will be eliminated.

The leg portion 820B of the first fixing portion 8B includes a small-diameter portion 822B and a second fixing portion 83. The small-diameter portion 822B has a cylindrical columnar shape. The small-diameter portion 822B has an outer diameter smaller than that of a large-diameter portion 821. The small-diameter portion 822B is connected to a lower surface 824. The small-diameter portion 822B includes a free end having a shape that is less likely to deform. Then, the small-diameter portion 822B is inserted into a board through-hole 73 of the circuit board 7. The second fixing portion 83 is then coupled to a lower end portion of the leg portion 820B.

The second fixing portion 83 is, for example, a push nut. Then, the second fixing portion 83 is fixed to the lower end portion of the small-diameter portion 822B passing downward through the board through-hole 73. The second fixing portion 83 is fixed to the small-diameter portion 822B by being pushed from a leading end of the small-diameter portion 822B using a jig. This prevents the small-diameter portion 822B from being removed from the board through-hole 73. At this time, the second fixing portion 83 comes into contact with a second wiring pattern 72. That is, the leg portion 820B includes the second fixing portion 83 that has conductivity and is coupled to the lower end portion of the small-diameter portion 822B. In other words, the second fixing portion 83 comes into contact with the second wiring pattern 72. This causes the small-diameter portion 822B to be indirectly connected to the second wiring pattern 72 using the second fixing portion 83. Using the second fixing portion 83 enables the small-diameter portion 822B to be easily fixed to the circuit board 7.

Although in the present modification, the push nut is used as the second fixing portion 83, the present disclosure is not limited to this. For example, welding, soldering, or the like may be used. Additionally, forming a male thread on the small-diameter portion 822B and using a nut to be screwed into the male screw also can be used. The second fixing portion 83 can widely have a structure capable of not only firmly fixing the first fixing portion 8B and the circuit board 7, but also firmly fixing the first fixing portion 8B to the first wiring pattern 71 and the second wiring pattern 72.

Figure 8:
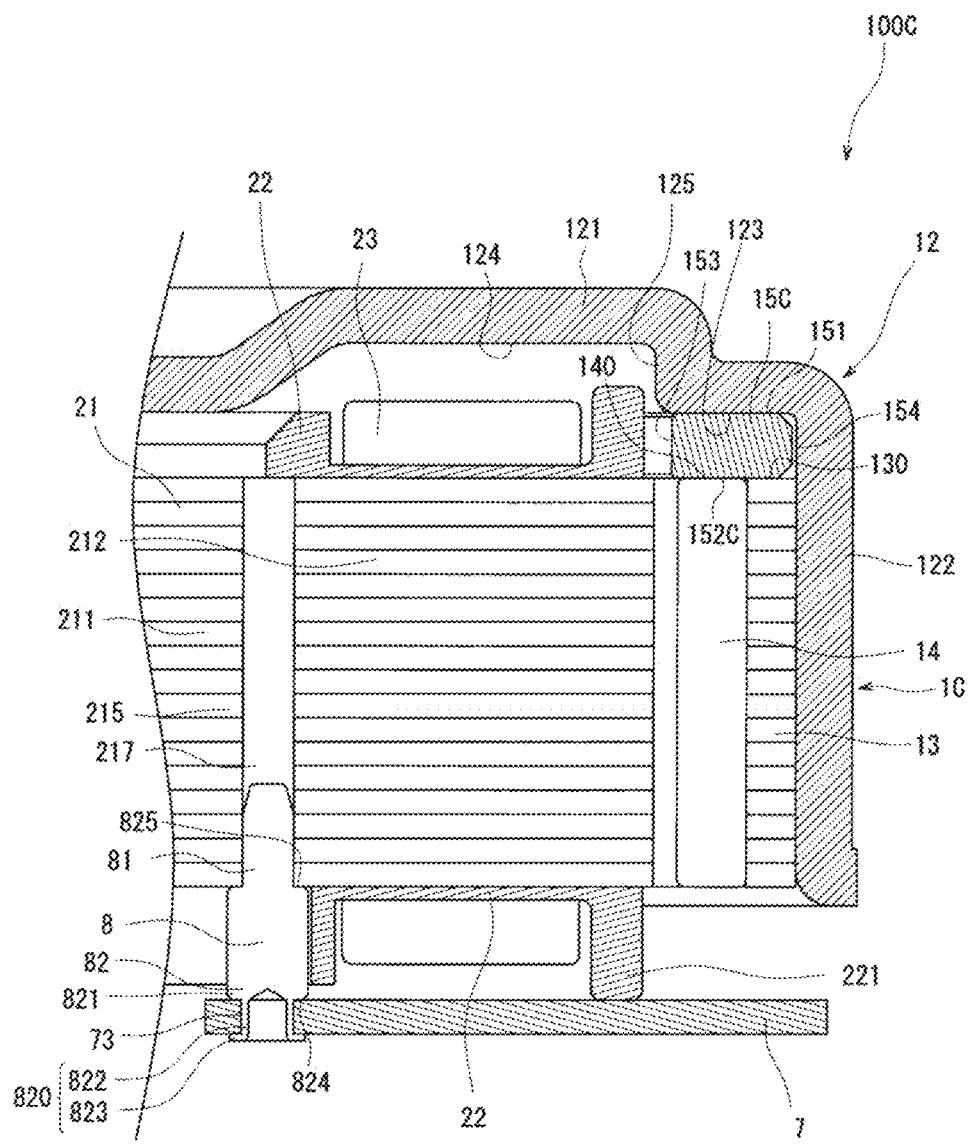
FIG. 8 is an enlarged sectional view of a rotor and a stator of a motor of a third modification of an example embodiment of the present disclosure.

FIG. 8 is an enlarged sectional view of a rotor 1C in a motor 100C of a third modification. The motor 100C has the same configuration as the motor 100, except that the rotor 1C includes a spacer 15C with a structure that is different from that of the rotor 1. Thus, a portion of the motor 100C that is substantially the same as that of the motor 100 is denoted by the same reference numeral, and duplicated detailed description will be eliminated.

As illustrated in FIG. 8, a radially inner end of a rotor core 13 and radially inner ends of magnets 14 overlap a spacer second surface 152C of the spacer 15C in the axial direction. This causes the entire rotor core upper surface 130 of the rotor core 13 and the entire magnet upper surface 140 of the magnets 14 to be in contact with the spacer second surface 152C. Thus, the rotor core 13 and the magnets 14 can be stably disposed in a rotor holder 12. This enables stabilizing rotation of the rotor 1.

Figure 9:
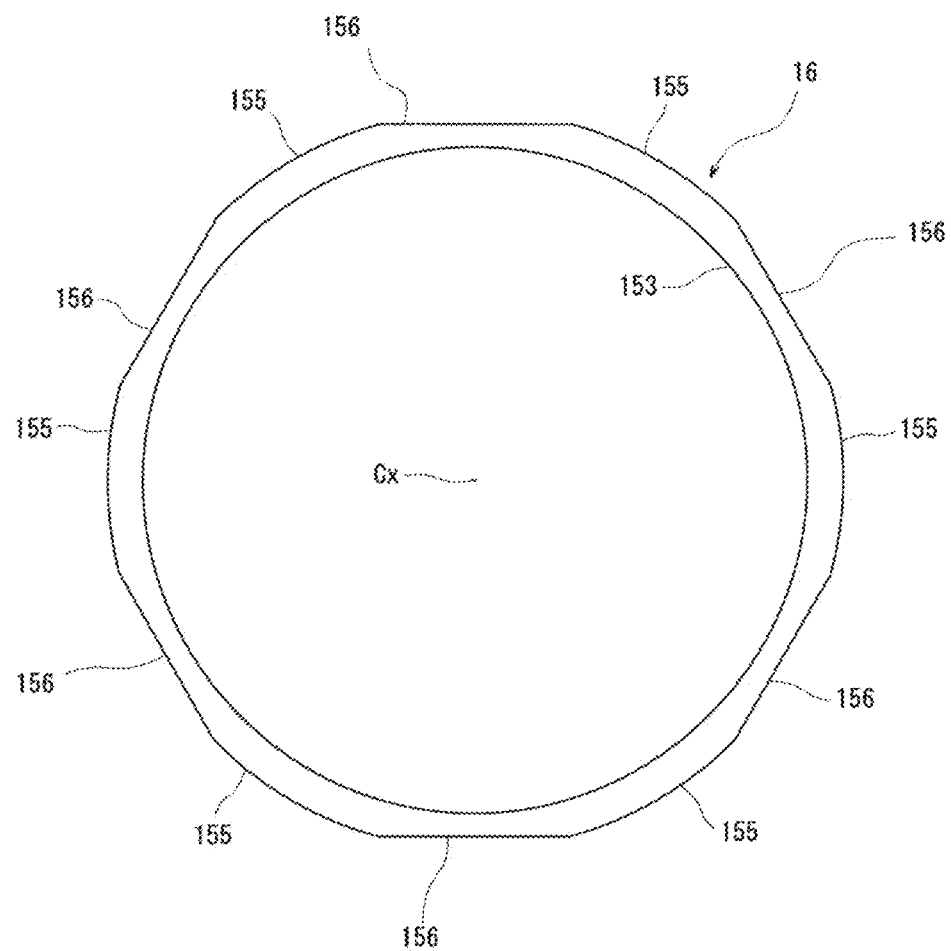
FIG. 9 is a plan view of a spacer of a fourth modification of an example embodiment of the present disclosure.

FIG. 9 is a plan view of a spacer 16 used in a motor of a fourth modification. As illustrated in FIG. 9, the spacer 16 has a radially outer edge in a shape in which a plurality of curved surface portions 155 and a plurality of flat surface portions 156 are disposed in the circumferential direction. Besides this portion, the spacer 16 has the same structure as the spacer 15. Thus, a portion of the spacer 16 that is substantially the same as that of the spacer 15 is denoted by the same reference numeral, and duplicated detailed description of the same portion is eliminated.

The curved surface portions 155 are each a part of a cylindrical columnar surface about a center axis. The flat surface portions 156 are each formed by cutting an outer surface of the corresponding one of the curved surface portions 155 into a flat shape in the circumferential direction. The flat surface portions 156 each constitute a chord as viewed in the axial direction.

As described above, the spacer 16 is housed inside the rotor holder 12. At this time, the curved surface portions 155 come into contact with an inner surface of a holder tubular portion 122. This causes frictional forces to be generated between the inner surface of the holder tubular portion 122 and the curved surface portions 155. In contrast, the flat surface portions 156 and the inner surface of the holder tubular portion 122 do not come into contact with each other, so that no frictional force is generated. That is, adjusting the curved surface portions 155 of the spacer 16 in size enables adjusting a frictional force between the spacer 16 and the holder tubular portion 122. Allowing the frictional force to be adjusted enables the spacer 16 to be easily housed inside the rotor holder 12, and enables restricting displacement of the spacer 16 in the axial direction. This enables improvement in workability.

Figure 10:
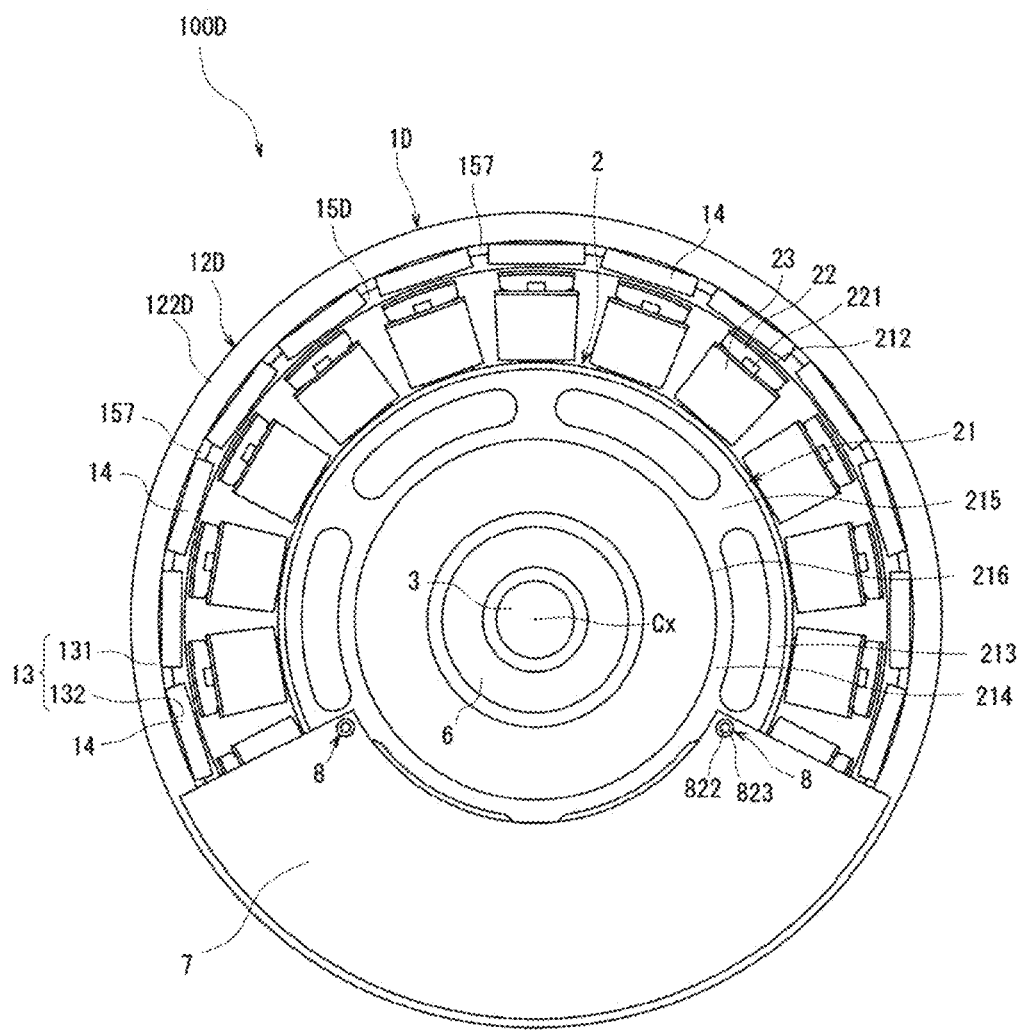
FIG. 10 is a view of a rotor and a stator of a motor of a fifth modification of an example embodiment of the present disclosure as viewed from below in the axial direction.
Figure 11:
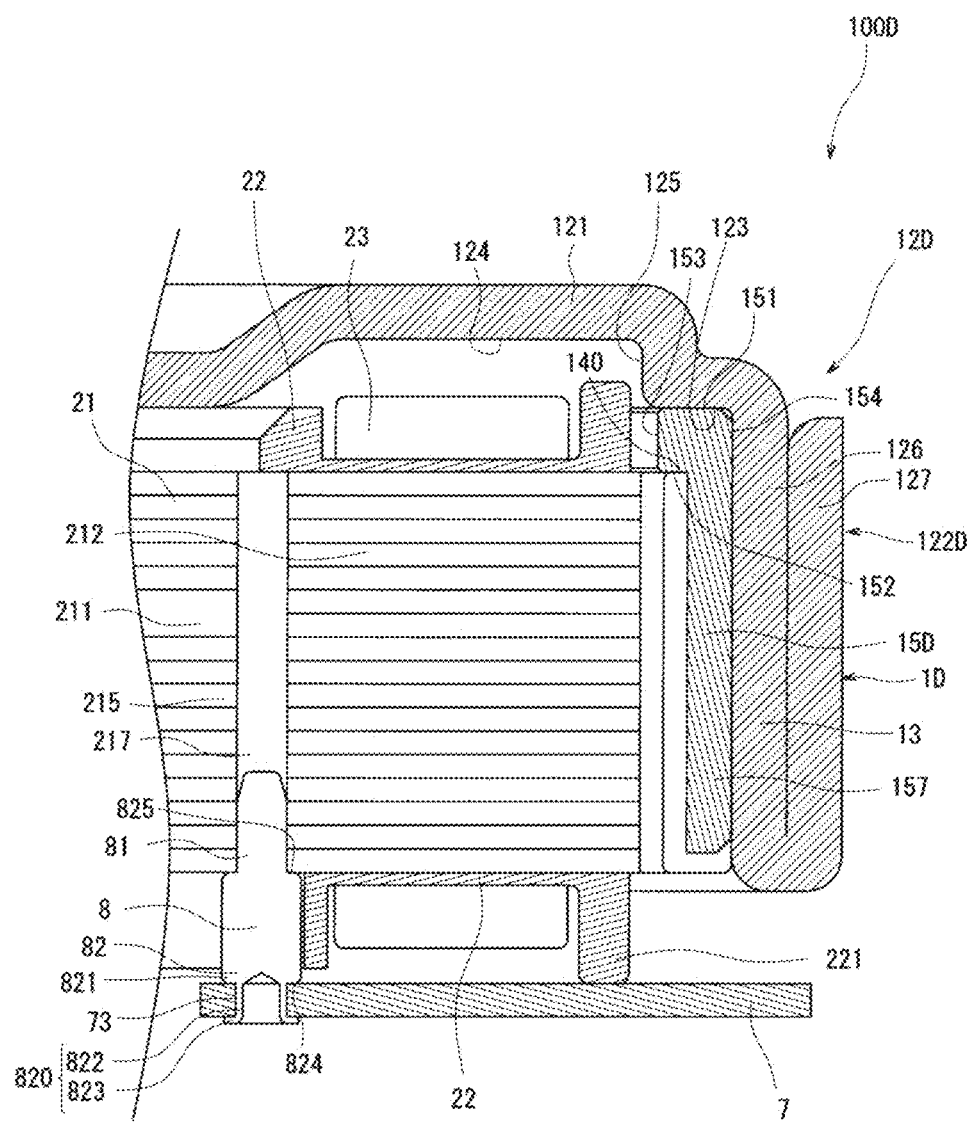
FIG. 11 is an enlarged longitudinal sectional view of a rotor and a stator of a motor of an example embodiment of the present disclosure.
Figure 12:
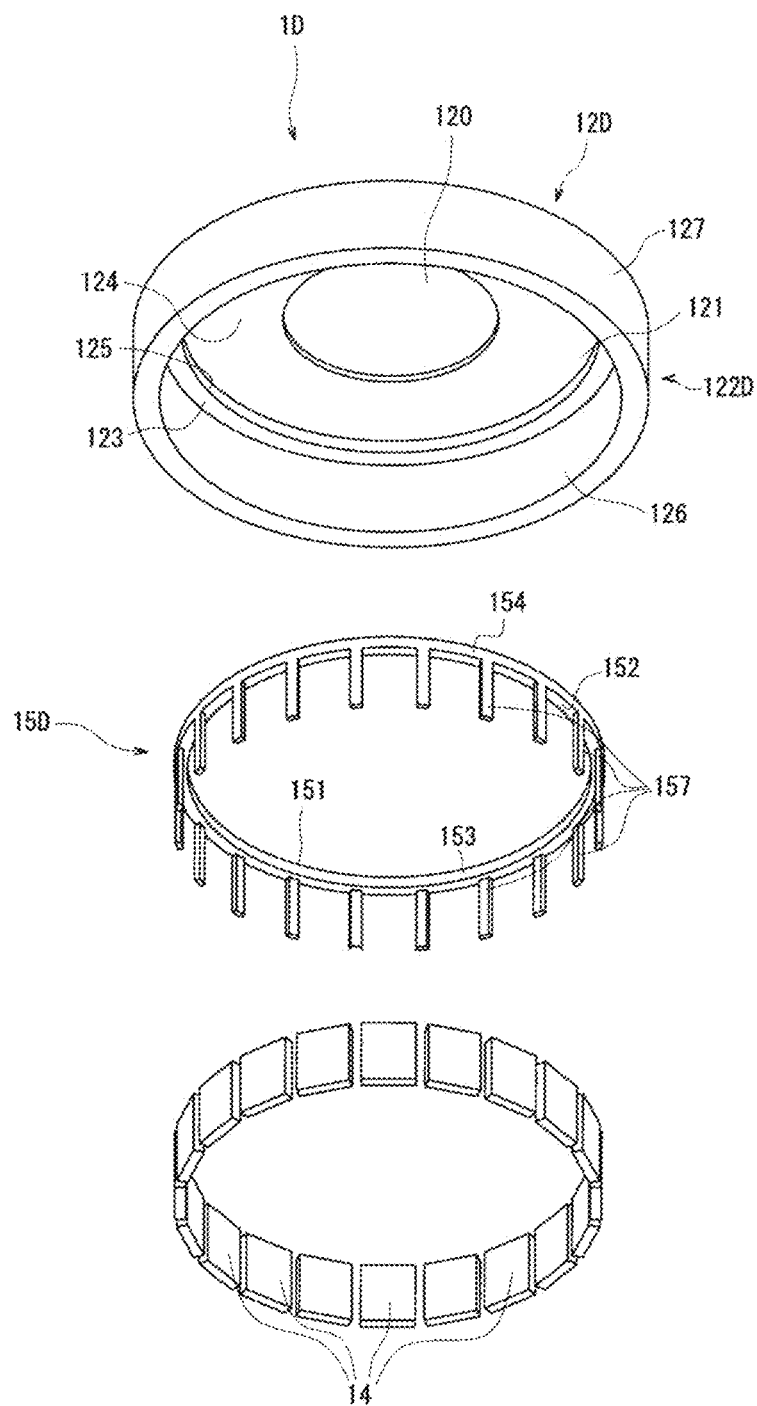
FIG. 12 is an exploded perspective view of a rotor of an example embodiment of the present disclosure as viewed from below in the axial direction.

FIG. 10 is a view of a rotor 1D and a stator 2 of a motor 100D of a fifth modification as viewed from below in the axial direction. FIG. 11 is an enlarged longitudinal sectional view of the rotor 1D and the stator 2 of the motor 100D. FIG. 12 is an exploded perspective view of the rotor 1D as viewed from below in the axial direction. The motor 100D is different in structure of a holder tubular portion 122D of a rotor holder 12D and a spacer 15D, and includes no rotor core. Besides this, the motor 100D has the same configuration as the motor 100. Thus, a portion of the motor 100D that is substantially the same as that of the motor 100 is denoted by the same reference numeral, and duplicated detailed description of the same portion will be eliminated.

As illustrated in FIGS. 10 and 11, the motor 100D includes the rotor holder 12D with the holder tubular portion 122D to which a plurality of magnets 14 is attached. The spacer 15D includes a plurality of spacer protrusions 157 extending axially downward from a spacer second surface 152.

The holder tubular portion 122D includes an inner tubular portion 126 and an outer tubular portion 127. The inner tubular portion 126 is connected to an outer edge of a holder lid portion 121. The outer tubular portion 127 has an inner surface that is in contact with an outer surface of the inner tubular portion 126. In the present modification, the outer tubular portion 127 is formed by folding outward an axially lower end portion of the inner tubular portion 126 and bringing the folded portion into contact with the outer surface of the inner tubular portion 126. The folding direction is a radially outward direction, but may be a radially inward direction.

The magnets 14 are directly attached to an inner surface of the holder tubular portion 122D. That is, in the motor 100D, a part of the holder tubular portion 122D serves as a rotor core.

In the motor 100D, the spacer 15D is disposed with a spacer first surface 151 in contact with a holder first surface 123. At this time, the spacer protrusions 157 of the spacer 15D are disposed in contact with the inner surface of the inner tubular portion 126. The spacer protrusions 157 are provided as many as the magnets 14 and are disposed at equal intervals in the circumferential direction. The magnets 14 are disposed in contact with the corresponding spacer protrusions 157 in the circumferential direction. That is, the spacer protrusions 157 position the corresponding magnets 14 in the circumferential direction.

The outer tubular portion 127 is disposed with an upper end positioned above magnet upper surface 140 of the magnets 14. The outer tubular portion 127 is disposed with a lower end positioned below magnet lower surface 141 of the magnets 14. When the outer tubular portion 127 is configured as described above, magnetic forces from the magnets 14 are less likely to be released radially outward.

The structure without a rotor core enables reducing the number of components of the motor 100D as compared with the motor 100. This facilitates manufacturing of the motor 100D. Additionally, the motor 100D also can be reduced in weight, and electric power required for operating the motor 100D can be reduced.

Figure 13:
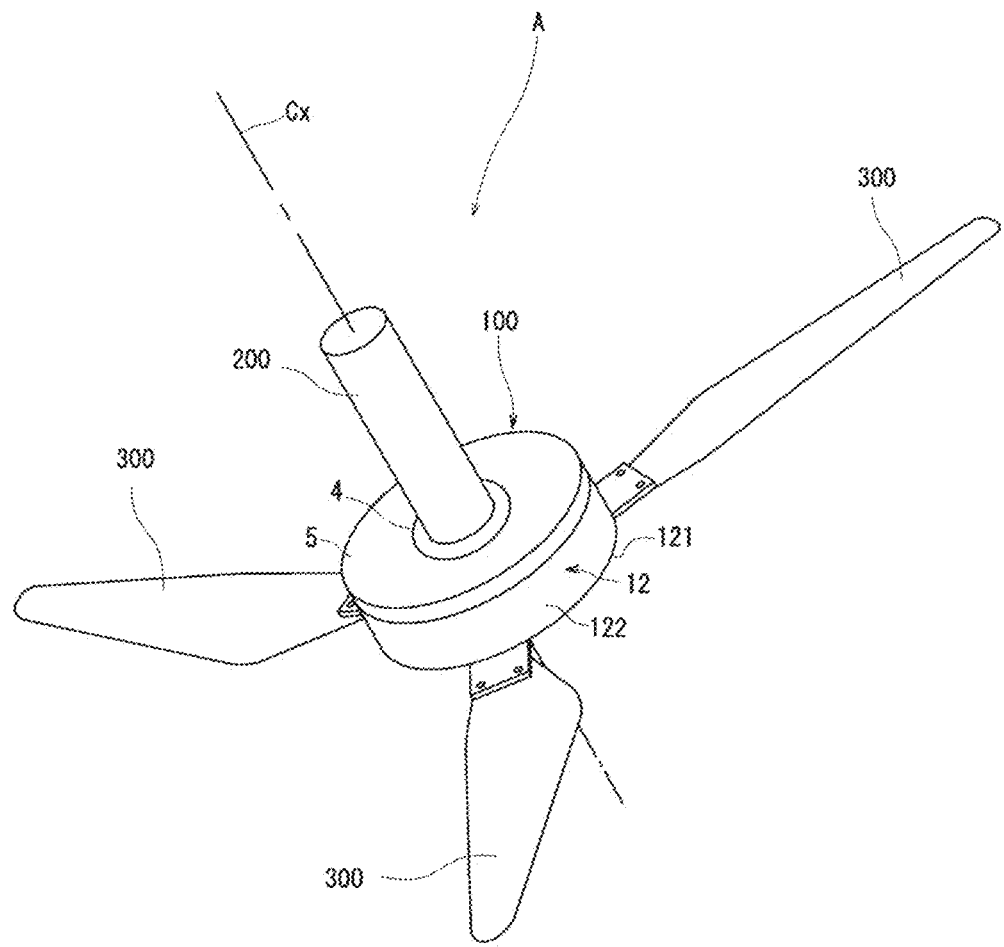
FIG. 13 is a perspective view illustrating an example of a ceiling fan using a motor according to an example embodiment of the present disclosure.

FIG. 13 is a perspective view illustrating an example of a ceiling fan A using the motor 100 according to the present disclosure. Although the motor 100 is used in the ceiling fan A in FIG. 13, the motors 100A to 100D of the modifications may be used.

The ceiling fan A includes the motor 100, a column 200, and blades 300. The column 200 is disposed along a center axis Cx extending vertically. The column 200 is, for example, a tubular member made of metal. The column 200 is provided inside with lead wires (not illustrated) connected to a circuit board 7. The column 200 may be made of a material other than metal, such as ceramic.

The column 200 is fixed to a ceiling (not illustrated) of a living room. The motor 100 is attached to a lower end of the column 200 in the axial direction. In the ceiling fan A, the motor 100 illustrated in FIG. 1 is attached to the column 200 while being vertically inverted. That is, a bracket 4 is fixed to the lower end of the column 200 in the axial direction.

Then, the blades 300 are attached to a holder lid portion 121 of a rotor holder 12. The blades 300 each have a shape extending in the axial direction as it extends in the circumferential direction. When the motor 100 rotates, the blades 300 rotate in the circumferential direction. When the blades 300 rotate, an airflow is generated in a direction along a center axis of the column 200.

The motor according to the present disclosure can be widely used as a power source not only for a blower apparatus but also for rotating a rotor.

Although the example embodiments of the present disclosure have been described above, the present disclosure is not limited to the contents described above. The example embodiments of the present disclosure can be modified in various ways without departing from the spirit of the disclosure.

The motor of the present disclosure can be used, for example, as a drive unit that drives a blower apparatus such as a circulator. Besides a blower apparatus, the motor of the present disclosure can be used as a power source for supplying a rotational force to the outside.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
   a rotor rotatable about a center axis extending vertically;
   a stator radially opposing the rotor;
   a bracket holding the stator;
   a circuit board including an upper surface with a first wiring pattern and a lower surface with a second wiring pattern; and
   a first fixing portion having conductivity and fixing the circuit board to the stator; wherein
   the stator includes a stator core having conductivity;
   the first fixing portion includes:
   a board holding portion holding the circuit board; and
   a stator fixed portion fixed to a portion of the stator core; and
   the board holding portion being in contact with the first wiring pattern and the second wiring pattern.

2. The motor according to claim 1, wherein
   the circuit board includes a board through-hole through which at least a portion of the board holding portion vertically passes;
   the board holding portion includes:
   a large-diameter portion extending axially and having an outer diameter larger than an inner diameter of the board through-hole; and
   a leg portion extending axially downward from a lower surface of the large-diameter portion;
   the lower surface of the large-diameter portion is in contact with the first wiring pattern; and
   the leg portion is inserted into the board through-hole and is in contact with the second wiring pattern.

3. The motor according to claim 2, wherein
   the leg portion includes:
   a small-diameter portion that has an outer diameter smaller than the large-diameter portion and is connected to the lower surface; and
   a caulked portion that is below the small-diameter portion and extends radially outward; and
   the caulked portion is in contact with the second wiring pattern.

4. The motor according to claim 2, wherein
the leg portion includes:
- a small-diameter portion that has an outer diameter smaller than the large-diameter portion and is connected to the lower surface; and
- a second fixing portion that has conductivity and is coupled to a lower end portion of the small-diameter portion; and the second fixing portion is in contact with the second wiring pattern.

5. The motor according to claim 2, wherein
the board through-hole includes an inner surface with a conductive portion that is electrically connected to the first wiring pattern and the second wiring pattern of the circuit board; and
the conductive portion is in contact with an outer surface of the leg portion.

6. The motor according to claim 1, wherein
the circuit board extends along a circumferential direction; and
two ends of the circuit board in the circumferential direction are each fixed to the stator core using the first fixing portion.

7. The motor according to claim 1, wherein
the stator core includes a core back portion fixed to the bracket, and teeth extending radially outward from the core back portion in a radial manner; and
the stator fixed portion is fixed radially inward of a radially inner end of each of the teeth of the core back portion.

8. The motor according to claim 7, wherein
the core back portion includes:
- a first annular portion in an annular shape connected to the teeth;
- a second annular portion in an annular shape that is radially inward of the first annular portion while being concentric with the first annular portion, and is fixed to the bracket; and
- a plurality of support ribs extending radially and connecting the first annular portion and the second annular portion; and the stator fixed portion is fixed to the support ribs.

9. The motor according to claim 1, wherein
the circuit board is mounted with a position detector to detect a position of the rotor.

* * * * *